United States Patent
Wakuda

(10) Patent No.: US 6,935,125 B2
(45) Date of Patent: Aug. 30, 2005

(54) AIR CONDITIONING SYSTEM

(75) Inventor: Susumu Wakuda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/844,611

(22) Filed: May 12, 2004

(65) Prior Publication Data

US 2004/0226306 A1 Nov. 18, 2004

(30) Foreign Application Priority Data

May 13, 2003 (JP) ........................................ 2003-134559

(51) Int. Cl.⁷ .............................................. F25B 13/00
(52) U.S. Cl. ........................... 62/160; 62/196.4; 62/244
(58) Field of Search ................ 62/160, 228.1, 62/239, 244, 196.3, 196.4

(56) References Cited

U.S. PATENT DOCUMENTS

| | | | | |
|---|---|---|---|---|
| 3,472,040 A | * | 10/1969 | Taylor | 62/117 |
| 5,056,324 A | * | 10/1991 | Haley | 62/115 |
| 5,291,941 A | | 3/1994 | Enomoto et al. | |
| 6,058,728 A | | 5/2000 | Takano et al. | |
| 6,105,375 A | | 8/2000 | Takano et al. | |
| 6,148,632 A | | 11/2000 | Kishita et al. | |
| 6,237,681 B1 | | 5/2001 | Takano et al. | |
| 6,244,060 B1 | | 6/2001 | Takano et al. | |
| 6,247,322 B1 | | 6/2001 | Ban et al. | |
| 6,250,093 B1 | | 6/2001 | Fujii et al. | |
| 6,250,094 B1 | | 6/2001 | Ban et al. | |
| 6,263,687 B1 | | 7/2001 | Ban et al. | |
| 6,266,965 B1 | | 7/2001 | Takano et al. | |
| 6,526,771 B2 | | 3/2003 | Takano et al. | |
| 6,584,785 B1 | | 7/2003 | Karl | |

FOREIGN PATENT DOCUMENTS

| | | |
|---|---|---|
| JP | 5-272817 | 10/1993 |
| JP | 11-257762 | 9/1999 |
| JP | 2002-277066 | 9/2002 |

* cited by examiner

*Primary Examiner*—Melvin Jones
(74) *Attorney, Agent, or Firm*—Harness, Dickey & Pierce, PLC

(57) ABSTRACT

When the air blowing amount of a blower 23 is large, a high pressure is controlled so as to be increased higher than when the air blowing amount by the blower 23 is small. By this construction, refrigerant noise is drowned out by air noise and is made difficult to hear. In addition, in general, as a high heating capability is required when the air blowing amount is large and, on the contrary, a high heating capability is not required when the air blowing amount is small, in the event that the high pressure is controlled based on the air blowing amount, the noise attributed to the refrigerant noise, that is felt by the occupants when heating is performed using the hot gas, can be reduced without damaging the sense of being heated.

6 Claims, 7 Drawing Sheets

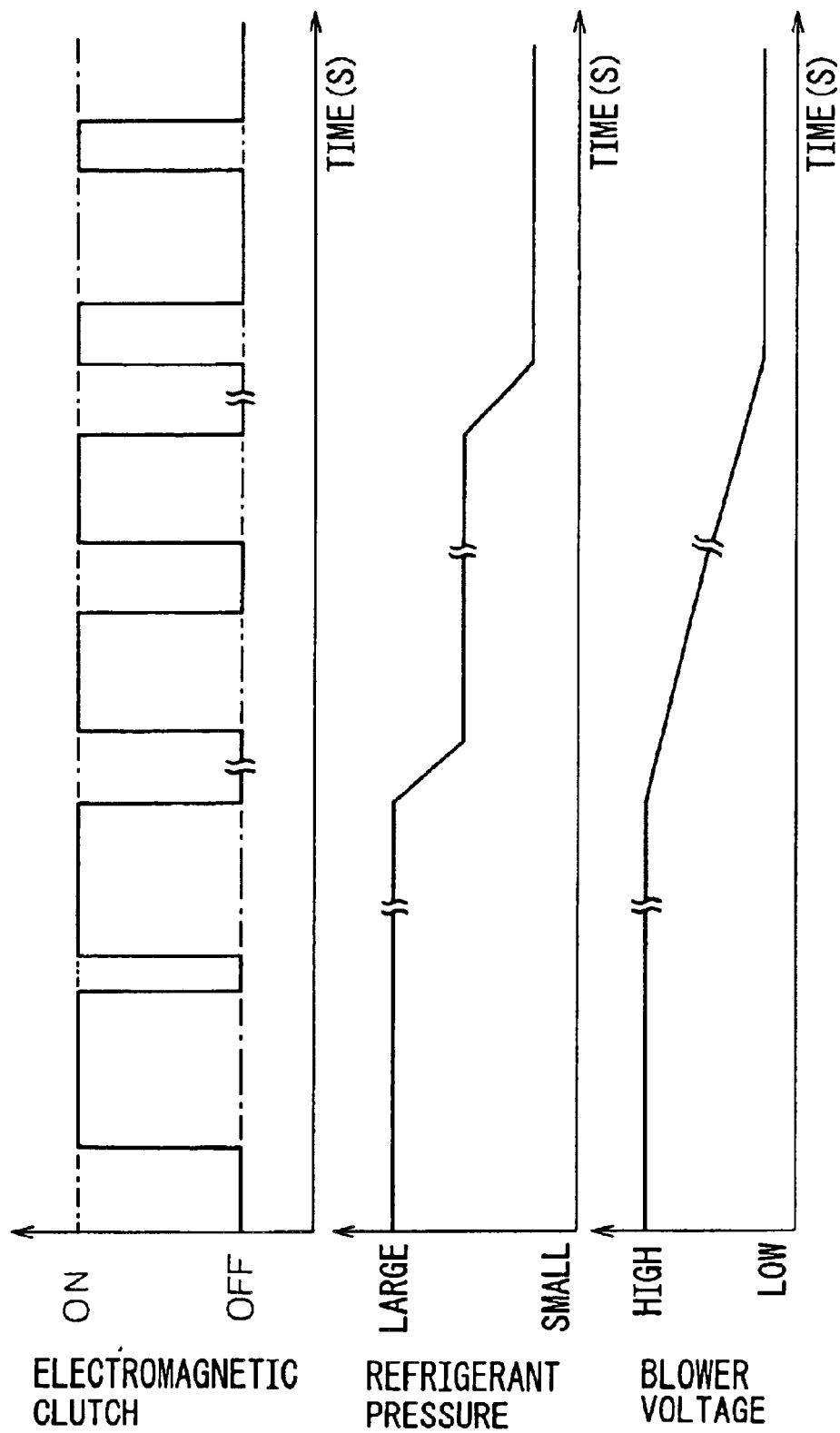

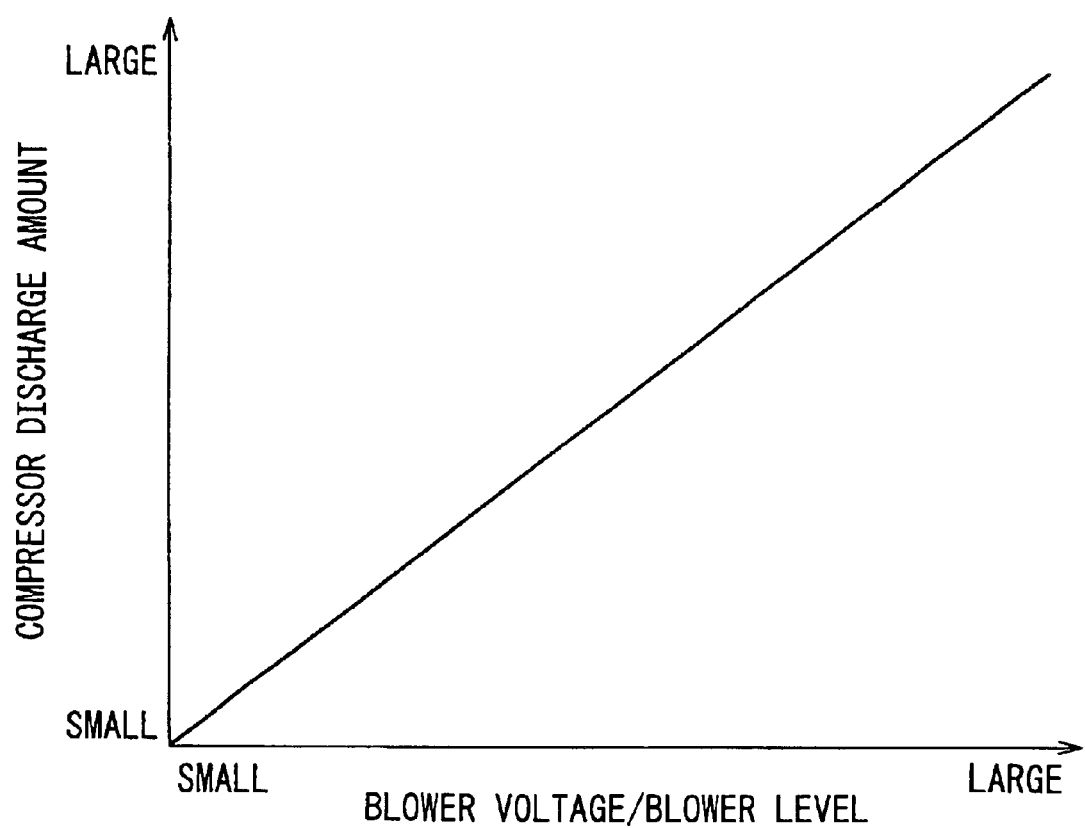

AIR CONDITIONING SYSTEM

BACKGROUND OF THE INVENTION

1. Field of the Invention

The present invention relates to an air conditioning system using a vapor compression-type refrigerating apparatus for moving heat on a low-temperature side to a high-temperature side, the air conditioning system being effective when applied to an automotive air conditioning system combined with a heater that makes use of waste heat generated in a vehicle.

2. Description of the Related Art

In the automotive air conditioning system combined with the heater which makes use of waste heat produced in a vehicle, as the amount of waste heat is small and the temperature is low at the time of a so-called cold start that results immediately after the start of an engine (an internal combustion engine) which constitutes a driving source for the vehicle, a sufficient heating capability cannot be obtained.

When the amount of waste heat is small and the temperature is low, in other words, when the temperature of engine coolant is low, a high-temperature refrigerant (hot gas) discharged from a compressor of the vapor compression-type refrigerating apparatus and not yet cooled is introduced into an inner heat exchanger so as to complement the heating capability (for example, see Japanese Unexamined Patent Publication No. 11-257762).

Incidentally, as has been described above, as the hot gas is introduced into the inner heat exchanger while maintaining its high-temperature and high-pressure state, the speed of the refrigerant which passes through the inner heat exchanger is relatively high.

Due to this, there is caused a risk that a relatively loud refrigerant noise is generated while complementing the heating capability with the hot gas.

SUMMARY OF THE INVENTION

In view of the aforesaid situation, a first object of the invention is to provide a novel air conditioning system which differs from conventional air conditioning systems and a second object thereof is to decrease the noise that occupants hear while heating using the hot gas is implemented.

With a view to attaining the objects, according to the invention, there is provided an air conditioning system comprising a compressor (10) for sucking in and compressing a refrigerant, an external heat exchanger (13) for performing heat exchange between outside air and the refrigerant, an inner heat exchanger (18) for performing heat exchange between air that is to be blown into a passenger compartment and the refrigerant, a pressure reducing device (17) provided along a refrigerant passageway which connects the external heat exchanger (13) with the inner heat exchanger (18) for reducing the pressure of the refrigerant, a bypass circuit (19) for introducing the refrigerant discharged from the compressor into the inner heat exchanger (18) by making the refrigerant bypass the external heat exchanger (13) and the pressure reducing apparatus (17), a selector valve for performing a selection between a cooling mode in which the refrigerant discharged from the compressor (10) is circulated through the external heat exchanger (13), the pressure reducing device (17), the inner heat exchanger (18) and the compressor (10) in that order and a hot gas heating mode in which the refrigerant discharged from the compressor (10) is circulated through the bypass circuit (19), the inner heat exchanger (18) and the compressor (10) in that order, a blower (23) for sending air into the inner heat exchanger (18) and a high-pressure control means (S5 to S19) for controlling a high pressure of the refrigerant discharged from the compressor (10) based on the air blowing amount so that the high pressure of the refrigerant is increased.

By this construction, the refrigerant noise, that is generated when the hot gas discharged from the compressor (10) passes through the inner heat exchanger, (18) increases as the refrigerant speed within in the inner heat exchanger, in other words, the pressure of the hot gas flowing into the inner heat exchanger (18) increases. On the other hand, the air noise generated by the blower (23) increases as the air blowing amount increases.

Consequently, in the invention, when the air blowing amount by the blower (23) is large, the refrigerant noise is drowned out by the air noise and it is difficult to hear in the event that, when the air blowing amount by the blower (23) is large, the high pressure is controlled so as to increase more than when the air blowing amount by the blower (23) is small.

In addition, in general, as a high heating capability is required when the air blowing amount is large and, on the contrary, a high heating capability is not required when the air blowing amount is small, in the event that the high pressure is controlled based on the air flow amount as with the invention, the noise attributed to the refrigerant noise, that is heard by the occupants when heating is performed using the hot gas, can be reduced without damaging the sense of being heated.

According to the invention, the high pressure control means (S5 to S19) controls the high pressure based on the air blowing amount only in a case where the refrigerant discharged from the compressor (10) is caused to flow to the inner heat exchange (18) side.

In addition, according to the invention, the high pressure control means (S5 to S19) controls the high pressure based on the air blowing amount only in a case where the refrigerant discharged from the compressor (10) is caused to flow to the bypass circuit (19) side.

According to the invention, the high pressure means (S5 to S19) may control the high pressure by controlling the flow rate of refrigerant discharged from the compressor (10).

According to the invention, the high pressure means (S5 to S19) may control the flow rate of refrigerant by controlling operating time and down time of the compressor (10).

According to the invention, the high pressure means (S5 to S19) may control the flow rate of refrigerant by switching on and off an electromagnetic clutch (11) for transmitting power to the compressor (10).

According to the invention, the compressor (10) is a variable displacement compressor which can change its capacity, and furthermore, the high pressure control means (S5 to S19) may control the flow rate of refrigerant by changing the capacity.

According to the invention, the compressor (10) is operated by obtaining power from a driving source for a vehicle.

The present invention may be more fully understood from the description of preferred embodiments of the invention, as set forth below, together with the accompanying drawings.

BRIEF DESCRIPTION OF THE DRAWINGS

In the drawings;

FIG. 6 is a drawing showing relationships between on-off control of an electromagnetic clutch 11, actual high pressure (refrigerant pressure) and amount of air sent (blower voltage), and elapse time when a hot gas heating mode is used, and FIG. 7 is a graph showing a relationship between a high pressure and the air blowing amount according to a second embodiment of the invention.

DESCRIPTION OF THE PREFERRED EMBODIMENTS

First Embodiment

Figure 1:
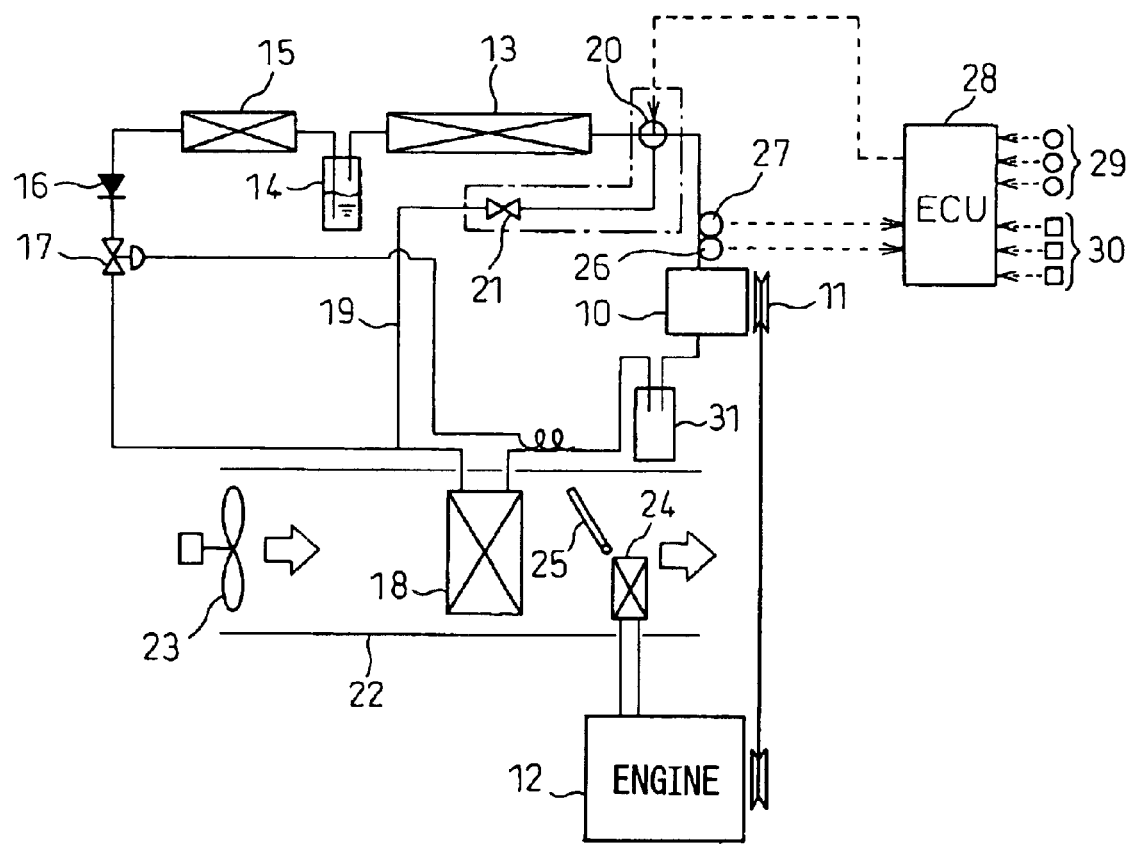
FIG. 1 is an exemplary drawing of an air conditioning system according to an embodiment of the invention.
Figure 2:
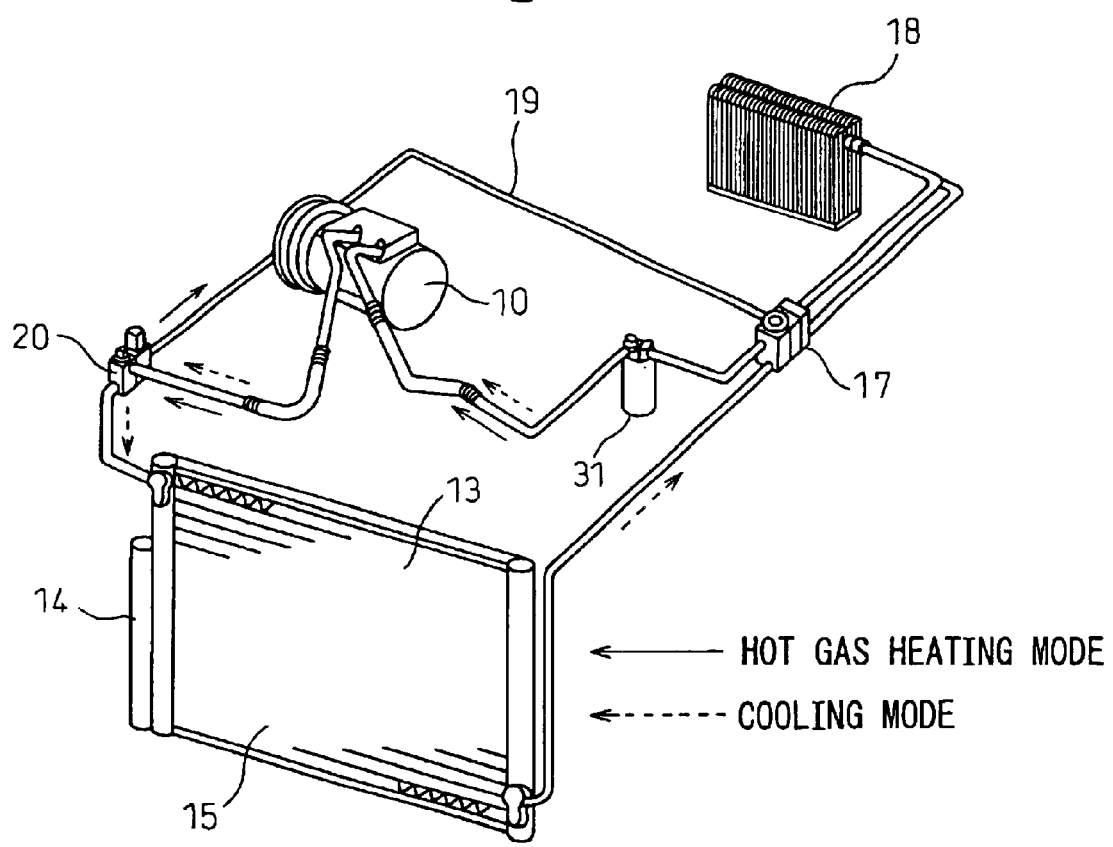
FIG. 2 is an explanatory drawing showing a state in which a vapor compression-type refrigerating apparatus according to the embodiment of the invention is installed in a vehicle.

This embodiment describes a case where an air conditioning system according to the invention is applied to an automotive air conditioning system, and FIG. 1 is an exemplary drawing of an air conditioning system, that is, a vapor compression-type refrigerating apparatus according to the embodiment, and FIG. 2 is an explanatory drawing showing a state in which the vapor compression-type refrigerating apparatus according to the embodiment is installed in a vehicle.

In FIG. 1, a compressor 10 sucks in and compresses a refrigerant, and this compressor 10 is driven by an engine 12, which constitutes a driving source for a vehicle, via a power transmission device such as an electromagnetic clutch 11 which intermittently transmits power.

Then, an external heat exchanger 13 performs a heat exchange between outside air and refrigerant, and a receiver 14 is a gas-liquid separator for separating a refrigerant discharged from the external heat exchanger 13 into a refrigerant in liquid phase and a refrigerant in gas phase so that an extra refrigerant is stored as a refrigerant in liquid phase and the liquid-phase refrigerant is supplied to an super cooling device 15.

Note that the super cooling device 15 is such as to cool a refrigerant that is cooled and condensed by the external heat exchanger 13 so as to lower further the enthalpy of the refrigerant, and a check valve 16 is provided on a refrigerant outlet side of the super cooling device 15 for controlling the flow of the refrigerant from the outlet side to an inlet side.

In addition, in the embodiment, as shown in FIG. 2, the external heat exchanger 13, the receiver 14 and the super cooling device 15 (including the check valve 16) are integrated into a single body via brazing.

In addition, as shown in FIG. 1, a pressure reducing device 17 for reducing the pressure of refrigerant to a pressure corresponding to a predetermined vaporizing temperature (for example, 2° C. to 3° C.) is provided on an outlet side of the excessively cooling device 15, that is, an outlet side of the check valve 16 and, in this embodiment, a so-called temperature-type expansion valve, whose restriction opening is controlled such that the degree of superheating of refrigerant on a refrigerant outlet side of an inner heat exchanger 18 becomes a predetermined value, is adopted as the pressure reducing device 17.

Then, an outlet side of the pressure reducing device 17 is connected to the inner heat exchanger 18 for performing heat exchange between air blown into the passenger compartment and the refrigerant, and an outlet side of the inner heat exchanger 18 is connected to an inlet side of the compressor 10.

In addition, a hot gas bypass passageway 19 is a bypass circuit for guiding a refrigerant (hot gas) discharged from the compressor (10) into the inner heat exchanger 18 by making the refrigerant bypass the external heat exchanger 13 and the pressure reducing device 17, and a three-way selector valve 20 is provided on a discharge side of the compressor 10 for selecting a flow between a case where hot gas is caused to flow to the inner heat exchanger 18 by causing the hot gas to bypass the external heat exchanger 18 side and the pressure reducing device 17 and a case where the refrigerant is caused to flow to the external heat exchanger 13 side.

Note that a restrictor 21 is provided at an outlet of the selector valve 20, which faces the hot gas bypass passageway 19, for reducing the pressure of hot gas supplied to the inner heat exchanger 18 to the maximum resistible pressure of the inner heat exchanger 18 or lower.

Then, in this embodiment, the selector valve 20 and the restrictor 21 are integrated into a single body. Incidentally, in this embodiment, as the restrictor 21, a fixed restrictor, such as an orifice or a capillary tube, is used in which the restriction opening is fixed.

In addition, an accumulator 31 is a gas-liquid separator for preventing a liquid-phase refrigerant being sucked into the compressor 10 during a hot gas heating mode, which will be described later.

Incidentally, the inner heat exchanger 18 is accommodated in an air conditioner casing 22 which constitutes a passageway for air blown into the passenger compartment, and a blower 23 is provided on an air-flow upstream side of the air conditioner casing 22 for sending air towards the inner heat exchanger 18.

Note that in FIG. 1, while the blower 23 is depicted as an axial fan (refer to JIS (Japanese Industry Standard) B 0132-1012), in reality, the blower 23 is a centrifugal fan (refer to JIS B 0132-1004).

In addition, a heater 24 for heating air that is blown into the passenger compartment using as a heat source waste heat generated by the engine coolant in the vehicle is accommodated in the air conditioner casing 22 on an air-flow downstream side of the inner heat exchanger 18.

Then, in this embodiment, the ratio of the amount of cooled air that flows to the passenger compartment side by bypassing the heater 24 and the amount of warm air that passes through the heater 24 so as to be heated is adjusted by an air mixing door 25, whereby the temperature and humidity of conditioned air that is blown into the passenger compartment is adjusted.

In addition, a pressure sensor 26 for detecting a high pressure which is the pressure of hot gas and a temperature sensor 27 for detecting the temperature of hot gas are provided on the discharge side of the compressor 10, and detection signals from these sensors 26, 27 are inputted into an ECU (an air conditioning electronic control unit) 28.

Then, in addition to detection values of the sensors 26, 27, inputted into the ECU 28 are signals from a group of air conditioning control sensors 29 such as an inside air sensor for detecting the temperature of inside air, an outside air sensor for detecting the temperature of outside air and a sunlight sensor for detecting the amount of sunlight radiated into the passenger compartment and operation switches 30 on an air conditioner operation panel, and the ECU 28 automatically controls air conditioning actuators including the electromagnetic clutch 11, the blower 23, the selector valve 24 and the air mixing door 25 using the input values as parameters while following a program stored in advance in a ROM.

Next, the operation of the air conditioning system according to the embodiment will be described.

1. Cooling Mode

In a cooling mode, the refrigerant discharged from the compressor 10 is made to circulate from the selector valve 24, the external heat exchanger 13, the receiver 14, the super cooling device 15, the pressure reducing device 17, the inner heat exchanger 18, the accumulator 31 and the compressor 10 in that order.

By this construction, at the external heat exchanger 13, the refrigerant is cooled to condense by outside air that is blown in by a cooling fan, not shown. Then, the refrigerant after condensation is separated into gas and liquid at the receiver 14, and only liquid refrigerant is allowed to flow into the pressure reducing device 17 via the super cooling device 15 and the check valve 16 so that the pressure of the refrigerant is reduced in an isenthalpic fashion at the pressure reducing device 17, a low-temperature, low-pressure refrigerant resulting.

Note that normally, when the refrigerant is reduced in pressure at the pressure reducing device 17, as the pressure is reduced in such a manner as to straddle a saturated liquid line, the refrigerant is in a two-phase state in which both liquid and gas phases exist.

Then, the low-pressure refrigerant whose pressure is so reduced flows into the inner heat exchanger 18 where the refrigerant absorbs heat from air blown thereinto by the blower 23 to be evaporated, whereby air, that is to be blown into the passenger compartment, is cooled, so that the interior of the passenger compartment is cooled.

2. Hot Gas Heating Mode

This mode may be automatically implemented in a case where, as the temperature of engine coolant is low or the temperature of outside air is extremely low, it is not possible to heat air only with the heater 24 to a sufficient temperature for heating or may be implemented manually in a case where a hot gas heating switch (not shown) is manually turned on.

Then, for example, when the hot gas heating switch is manually turned on to select the hot gas heating mode, the refrigerant discharged from the compressor 10 is caused to circulate from the selector valve 20, the restrictor 21, the bypass circuit 19, the inner heat exchanger 18, the accumulator 31 and the compressor 10 in that order.

By this construction, the hot gas which is reduced in pressure to the maximum resistible pressure of the inner heat exchanger 18 at the restrictor 21 flows into the inner heat exchanger 18, where air that is blown into the inner heat exchanger 18 is heated.

As this occurs, the discharge pressure of the compressor 10, that is, the high pressure is controlled based on the air blowing amount such that when the air blowing amount of the blower 23 is large, the high pressure is further increased when compared with when the air blowing amount is small to, as an upper limit, a pressure that results from adding a safety factor to the maximum resistible pressure of the inner heat exchanger 18.

Figure 3:
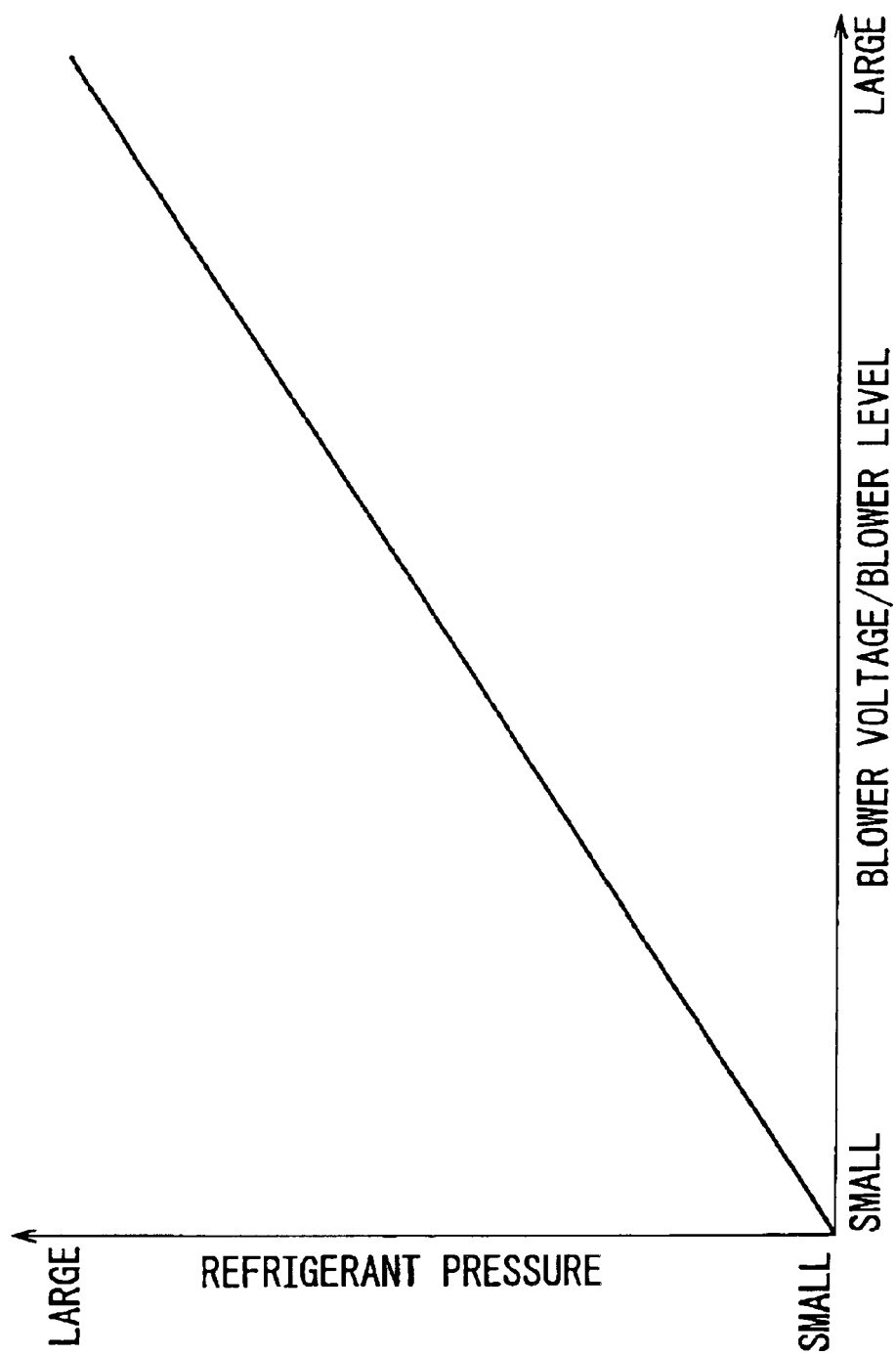
FIG. 3 is a graph showing a relationship between a high pressure and the air blowing amount according to a first embodiment of the invention.

To be specific, in this embodiment, as shown in FIG. 3, the high pressure (the refrigerant pressure) is increased linearly according to an increase in the air blowing amount, that is, a voltage applied to the blower 23.

Note that in this embodiment, while the air blowing amount of the blower 23 is automatically selected based on a target outlet temperature TAO and the temperature of engine coolant flowing into the heater 24, needless to say, the high pressure is automatically controlled based on an air blowing amount selected manually by an occupant.

Figure 4:
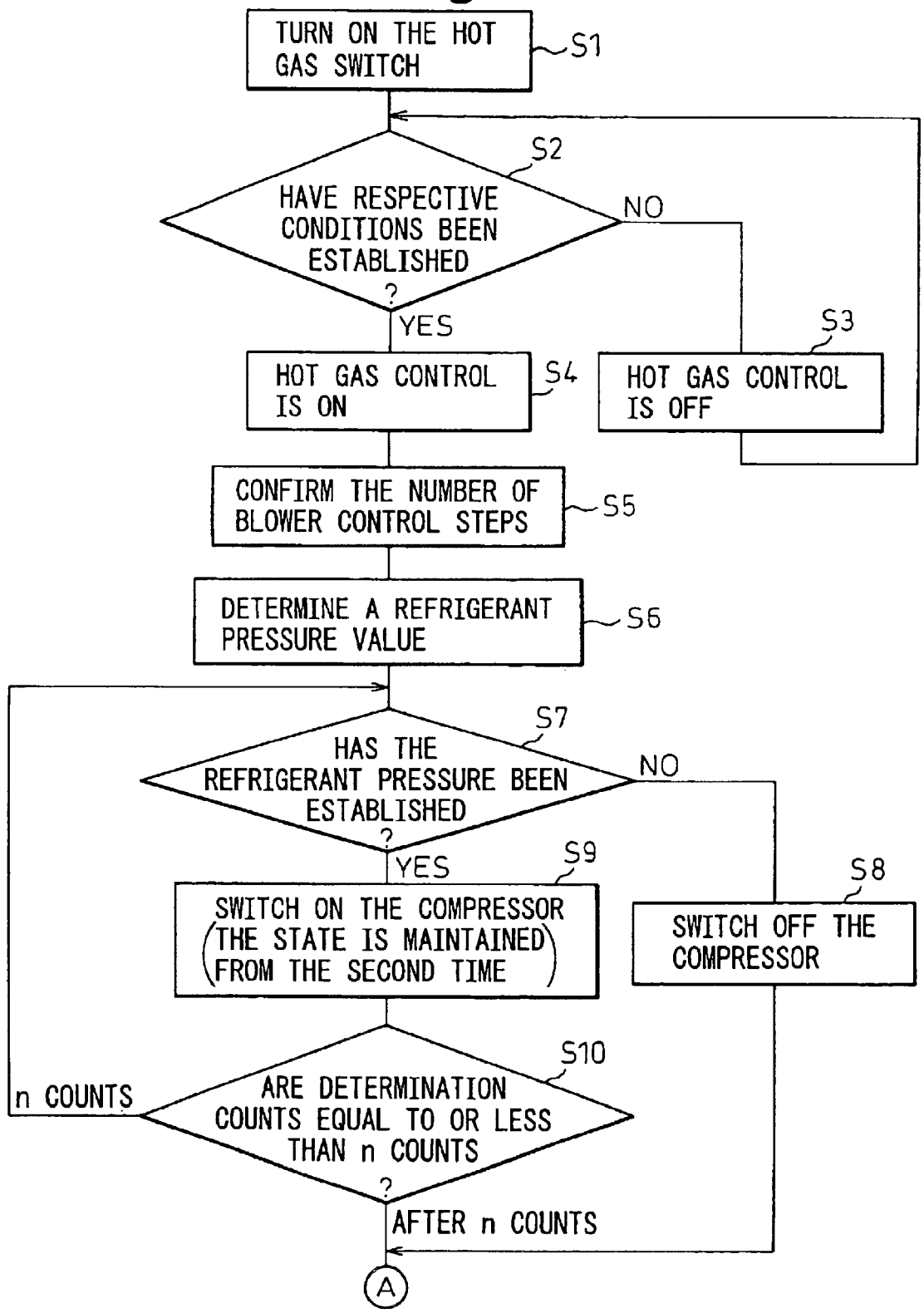
FIG. 4 is a flowchart showing a control of the air conditioning system according to the first embodiment of the invention.
Figure 5:
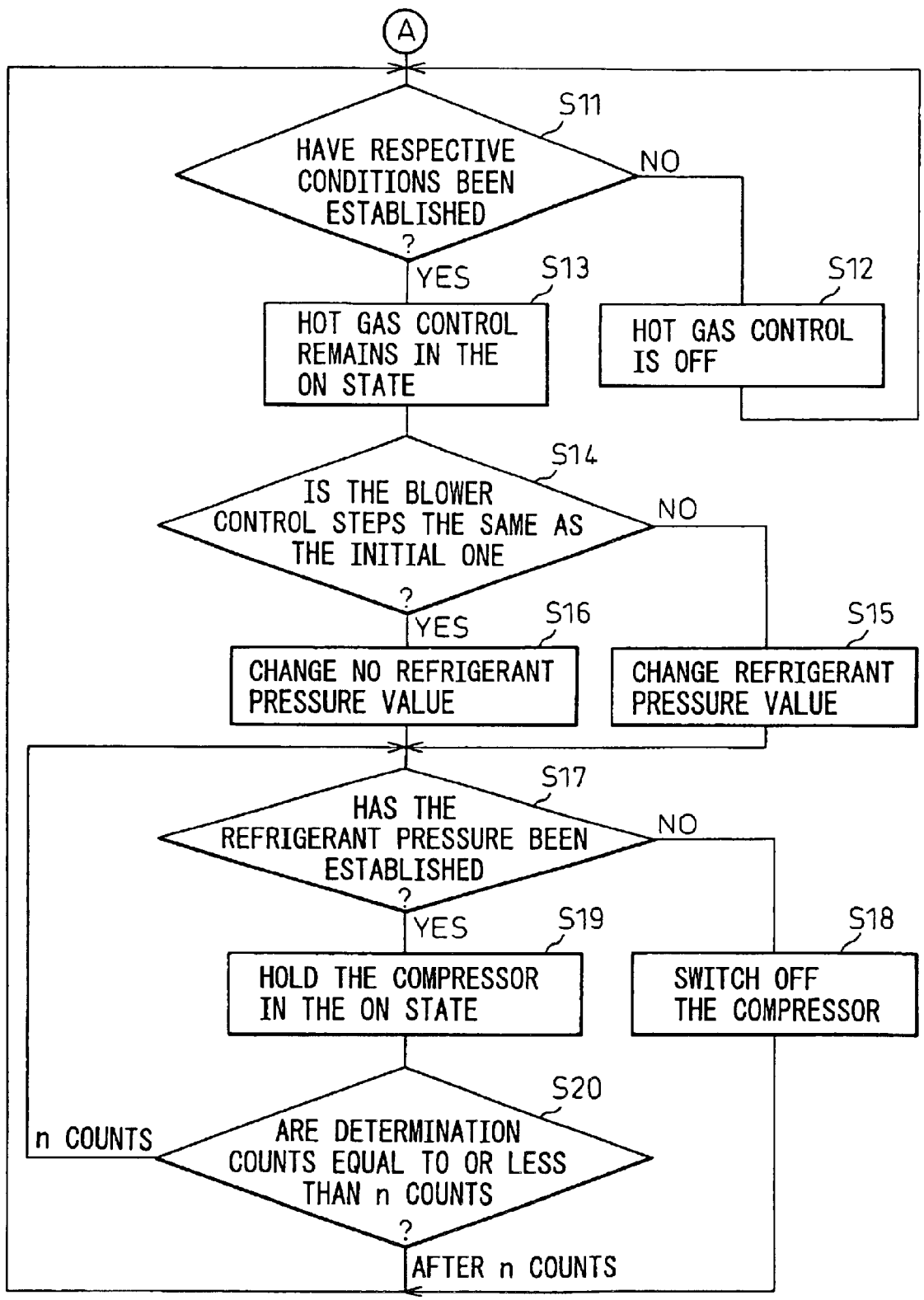
FIG. 5 is a flowchart showing the control of the air conditioning system according to the first embodiment of the invention.

Incidentally, in this embodiment, the high pressure is controlled by controlling the flow rate of refrigerant discharged from the compressor 10, that is, the flow rate of discharged refrigerant per unit time by, in turn, controlling the operating time and down time of the compressor 10, that is, ON time and OFF time of the electromagnetic clutch 11, and a specific control method will be described below by reference to flowcharts shown in FIGS. 4, 5.

For example, in a case where the hot gas heating switch is manually turned on, whether or not the hot gas heating mode really needs to be implemented is determined based on whether or not the outside temperature is equal to or lower than a predetermined temperature (for example, 10° C.) or whether or not the engine coolant temperature is equal to or lower than a predetermined temperature (for example, 60° C.) (S1, S2).

Then, in the event that the outside temperature is higher than the predetermined temperature or in the event that the engine coolant temperature is higher than the predetermined temperature, considering that the hot gas heating mode does not need to be implemented, heating is performed only by the heater, that is, the engine coolant with the hot gas heating switch being turned off (S3).

In contrast, in the event that the outside temperature is equal to or lower than the predetermined temperature, or in the event that the engine coolant temperature is equal to or lower than the predetermined temperature, considering that the hot gas heating mode needs to be performed, the hot gas heating mode is executed (S4). Note that when the hot gas heating mode is initiated automatically, the flow starts from S4.

Next, a current air blowing amount is detected from control signals from the ECU 28, and a target high pressure refrigerant pressure (hereinafter, referred to as a target high pressure) is determined from the air blowing amount so detected based on a map shown in FIG. 3 (S5, S6).

Then, whether or not an actual high refrigerant pressure, that is, the detected pressure by the pressure sensor 26 (hereinafter, referred to as an actual high pressure) exceeds the target high pressure is determined (S7), and if the actual high pressure exceeds the target high pressure, the energization to the electromagnetic clutch 11 is disrupted so as to stop the compressor 10 (S2), and thereafter S11 is executed.

In contrast, if the actual high pressure is equal to or lower than the target high pressure, the energization of the electromagnetic clutch 11 is made to continue so that the compressor 10 is made to continue to operate (S9). Note that when the count of the determination, that the actual high pressure exceeds the target high pressure, exceeds a predetermined count (for example, ten), or when the continuous operating time of the compressor 10 in step S6 and onward exceeds a predetermined length of time, then, using a similar method to that in S2, whether or not the hot gas heating mode really needs to be performed is determined (S10, S11).

Then, if the outside air temperature is higher than the predetermined temperature, or if the engine coolant temperature is higher than the predetermined temperature, considering that the hot gas heating mode does not have to be carried out, heating is carried out only by the heater, that is, the engine coolant with the hot gas heating switch being broken.

On the contrary, if the outside air temperature is equal to or lower than the predetermined temperature, or if the engine coolant temperature is equal to or lower than the predetermined temperature, considering that the hot gas heating mode needs to be carried out, the hot gas heating mode is executed (S13).

Next, the current air blowing amount is detected from control signals from the ECU 28, and a target high pressure is determined from the air blowing amount so detected. In other words, if the air blowing amounts are the same, the target high pressure that was previously determined is maintained, or if the air blowing amount differs from the previous amount, a target high pressure is newly determined (S14 to S16).

Then, whether or not the actual high pressure exceeds the target high pressure is determined (S17), and if the actual high pressure exceeds the target high pressure, the energization to the electromagnetic clutch 11 is disrupted so as to stop the compressor 10 (S18), and thereafter S11 is executed.

In contrast, if the actual high pressure is equal to or lower than the predetermined pressure, the energization of the electromagnetic clutch 11 is made to continue, and the compressor 10 is made to continue to operate (S9). Note that when the count of determination, that the actual high pressure is equal to or lower than the target high pressure, exceeds a predetermined count (for example, ten), or the continuous operating time of the compressor 10 in S6 and onward exceeds a predetermined length of time, using the same method as that in S2, whether or not the hot gas heating mode needs to be really carried out is determined again (S20, S11).

Next, the function and advantages of the embodiment will be described.

The refrigerant noise that is generated when the hot gas passes through the inner heat exchanger 18 increases as the refrigerant speed within in the inner heat exchanger 18, in other words, the pressure of the hot gas flowing into the inner heat exchanger 18 increases. On the other hand, the air noise due to the blower 23 increases as the air blowing amount increases.

Consequently, in the invention, when the air blowing amount by the blower 23 is large, the refrigerant noise is drowned out by the air noise and it is difficult to hear in the event that, when the air blowing amount by the blower 23 is large, the high pressure is controlled so as to be increased higher than when the air blowing amount by the blower 23 is small.

In addition, in general, as a high heating capability is required when the air blowing amount is large, and on the contrary, a high heating capability is not required when the air blowing amount is small, in the event that the high pressure is controlled based on the air blowing amount as with the invention, the noise attributed to the refrigerant noise, that is felt by the occupants when heating is performed using the hot gas, can be reduced without damaging the sense of being heated.

Note that FIG. 6 is one example of a chart showing a relationship between ON-OFF control of the electromagnetic clutch when the hot gas heating mode is used, actual high pressure (refrigerant pressure) and air blowing amount (blower voltage), and elapsed time.

Second Embodiment

While, in the first embodiment, the high pressure is controlled by controlling the flow rate of refrigerant discharged from the compressor 10 by, in turn, controlling the operating time and down time of the compressor 10, the invention is not limited thereto. In this second embodiment, a variable displacement compressor which can change the discharge amount is used as the compressor 10, so that, as shown in FIG. 7, the high pressure is controlled by controlling the refrigerant flow rate by changing the discharge amount.

Note that in this embodiment, a swash plate-type variable displacement compressor is used as a variable displacement compressor in which the discharge amount is continuously changed by continuously changing the stroke of a piston by continuously changing the inclination angle of the swash plate.

Incidentally, the discharge amount of the swash plate-type variable displacement compressor means a discharge amount that is determined by the stroke of piston, the diameter of a cylinder bore and the number of cylinders.

Other Embodiments

In the embodiments, the blower 23 is such as to use the centrifugal fan, but the invention is not limited thereto and, needless to say, a blower 23 using an axial fan can be used.

In addition, in the embodiments, the temperature and humidity of conditioned air that is to be blown into the passenger compartment is adjusted by controlling the ratio of the amount of warm air and the amount of cold air by the air mixing door 25, but the invention is not limited thereto and, for example, a re-heat method may be used in which the entirety of cold air that has passed through the inner heat exchanger 18 is heated by the heater 24, and the temperature and humidity of conditioned air that is to be blown into the passenger compartment is controlled by controlling the heating amount by the heater 24.

In addition, in the aforesaid embodiments, the pressure of refrigerant is reduced by the pressure reducing device 17 in the isenthalpic fashion, but the invention is not limited thereto, and energy may be recovered while the refrigerant is reduced in pressure and is expanded in volume in an isentropic fashion using an expansion device.

In addition, in the embodiments, the refrigerant discharged from the compressor 10 is caused to circulate from the selector valve 20, the restrictor 21, the bypass circuit 19, the inner heat exchanger 18 and the compressor 10 in that order during the hot gas heating mode, but the invention is not limited thereto and, for example, a second pressure reducing device may be provided, so that the refrigerant discharged from the compressor 10 may be caused to circulate from the selector valve 20, the restrictor 21, the bypass circuit 19, the inner heat exchanger 18, the second pressure reducing device, the external heat exchanger 13 and the compressor 10 in that order, whereby a heat pump operation may be performed in which heat is absorbed from outside air by the external heat exchanger 13.

In addition, in the above embodiments, the compressor 10 is made to operate by obtaining power from the engine, but the invention is not limited thereto and, for example, an electric motor may be provided exclusively for operating the compressor 10, so that the high pressure is controlled by controlling the rotational speed of the compressor 10.

Additionally, in the embodiments, the invention is applied to the automotive air conditioning system, but the invention is not limited thereto.

In addition, in the embodiments, the external heat exchanger 13, the receiver 14 and the super cooling device 15 (including the check valve 16) are integrated into the single unit, but the invention is not limited thereto.

Additionally, in the embodiments, the high pressure is made to be equal to or lower than the critical pressure, but the invention is not limited thereto and, for example, the high pressure may be equal to or higher than the critical pressure by using a gas such as carbon dioxide as the refrigerant.

What is claimed is:

1. An air conditioning system comprising
   a compressor for drawing in and compressing a refrigerant,
   an external heat exchanger for performing heat exchange between outside air and the refrigerant,
   an inner heat exchanger for performing heat exchange between air that is to be blown into a passenger compartment and the refrigerant,
   a pressure reducing device provided along a refrigerant passageway which connects the external heat exchanger with the inner heat exchanger for reducing the pressure of the refrigerant,
   a bypass circuit for introducing the refrigerant discharged from the compressor into the inner heat exchanger by making the refrigerant bypass the external heat exchanger and the pressure reducing apparatus,
   a selector valve for performing a selection between a cooling mode in which the refrigerant discharged from the compressor is circulated from the external heat exchanger, the pressure reducing device, the inner heat exchanger and the compressor in that order and a hot gas heating mode in which the refrigerant discharged from the compressor is circulated from the bypass circuit, the inner heat exchanger and the compressor in that order,
   a blower for sending air into the inner heat exchanger, and
   high-pressure control means for controlling a high pressure of the refrigerant discharged from the compressor based on the air blowing amount so that the high pressure of the refrigerant is increased; wherein
   the high pressure control means controls the high pressure based on the air blowing amount only in a case where the refrigerant discharged from the compressor is caused to flow to the inner heat exchange side.

2. An air conditioning system comprising
   a compressor for drawing in and compressing a refrigerant,
   an external heat exchanger for performing heat exchange between outside air and the refrigerant,
   an inner heat exchanger for performing heat exchange between air that is to be blown into a passenger compartment and the refrigerant,
   a pressure reducing device provided along a refrigerant passageway which connects the external heat exchanger with the inner heat exchanger for reducing the pressure of the refrigerant,
   a bypass circuit for introducing the refrigerant discharged from the compressor into the inner heat exchanger by making the refrigerant bypass the external heat exchanger and the pressure reducing apparatus,
   a selector valve for performing a selection between a cooling mode in which the refrigerant discharged from the compressor is circulated from the external heat exchanger, the pressure reducing device, the inner heat exchanger and the compressor in that order and a hot gas heating mode in which the refrigerant discharged from the compressor is circulated from the bypass circuit, the inner heat exchanger and the compressor in that order,
   a blower for sending air into the inner heat exchanger, and
   high-pressure control means for controlling a high pressure of the refrigerant discharged from the compressor based on the air blowing amount so that the high pressure of the refrigerant is increased; wherein
   the high pressure control means controls the high pressure based on the air blowing amount only in a case where the refrigerant discharged from the compressor is caused to flow to the bypass circuit side.

3. An air conditioning system comprising
   a compressor for drawing in and compressing a refrigerant,
   an external heat exchanger for performing heat exchange between outside air and the refrigerant,
   an inner heat exchanger for performing heat exchange between air that is to be blown into a passenger compartment and the refrigerant,
   a pressure reducing device provided along a refrigerant passageway which connects the external heat exchanger with the inner heat exchanger for reducing the pressure of the refrigerant,
   a bypass circuit for introducing the refrigerant discharged from the compressor into the inner heat exchanger by making the refrigerant bypass the external heat exchanger and the pressure reducing apparatus,
   a selector valve for performing a selection between a cooling mode in which the refrigerant discharged from the compressor is circulated from the external heat exchanger, the pressure reducing device, the inner heat exchanger and the compressor in that order and a hot gas heating mode in which the refrigerant discharged from the compressor is circulated from the bypass circuit, the inner heat exchanger and the compressor in that order,
   a blower for sending air into the inner heat exchanger, and
   high-pressure control means for controlling a high pressure of the refrigerant discharged from the compressor based on the air blowing amount so that the high pressure of the refrigerant is increased; wherein
   the high pressure means controls the high pressure by controlling the flow rate of refrigerant discharged from the compressor (10).

4. An air conditioning system as set forth in claim 3, wherein the high pressure means controls the flow rate of refrigerant by controlling operating time and down time of the compressor.

5. An air conditioning system as set forth in claim 3, wherein the high pressure means controls the flow rate of refrigerant by switching on and off an electromagnetic clutch for transmitting power to the compressor.

6. An air conditioning system as set forth in claim 3, wherein the compressor is a variable displacement compressor which can change the theoretical capacity, and furthermore, wherein the high pressure control means controls the flow rate of refrigerant by changing the theoretical capacity.

* * * * *